Aug. 4, 1959  J. FERRERA  2,898,144
FLOOR SUPPORTING MEANS FOR EXPANSIBLE TRAILERS
Filed July 22, 1957  3 Sheets-Sheet 2
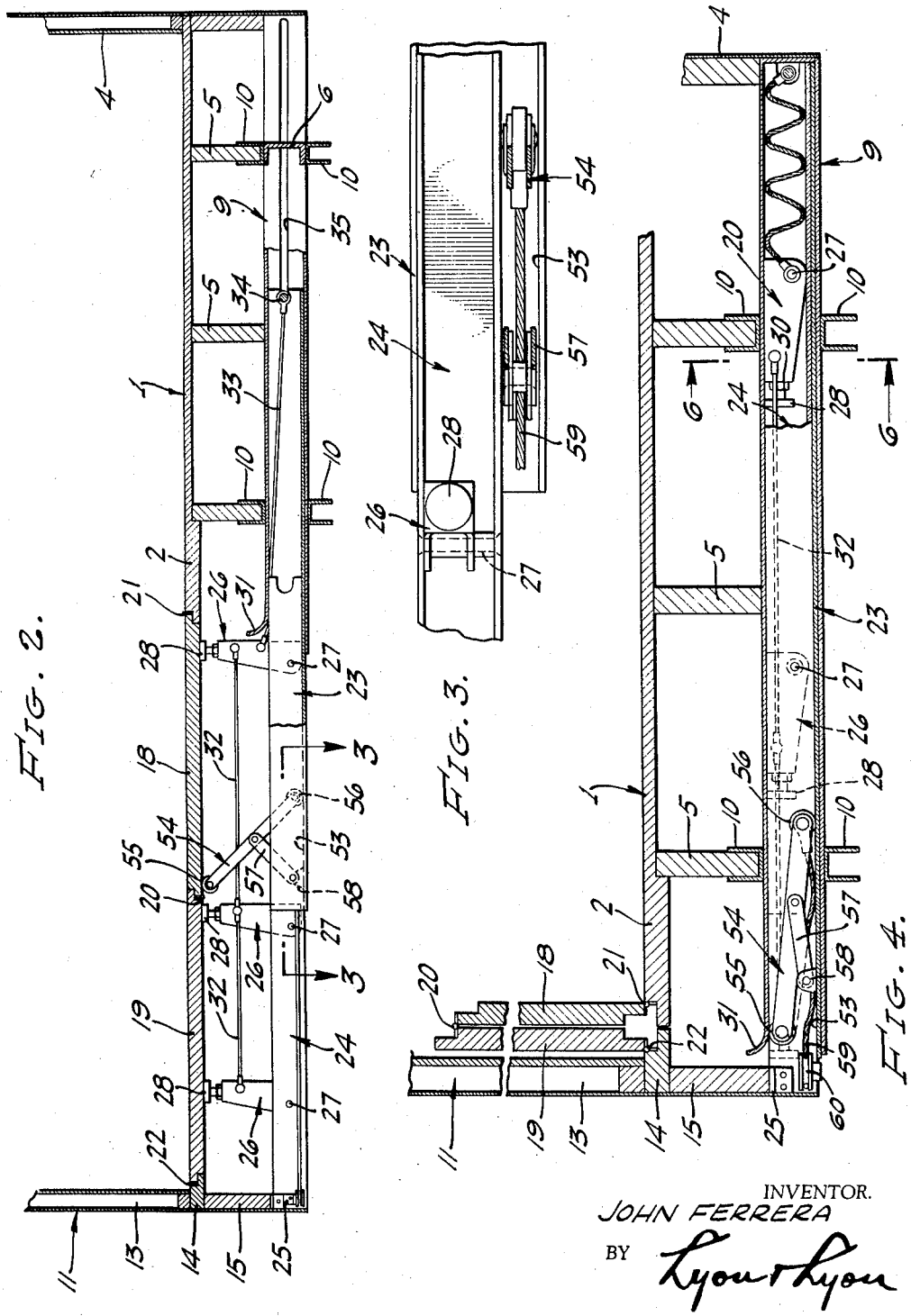
INVENTOR.
JOHN FERRERA
BY Lyon & Lyon
ATTORNEYS

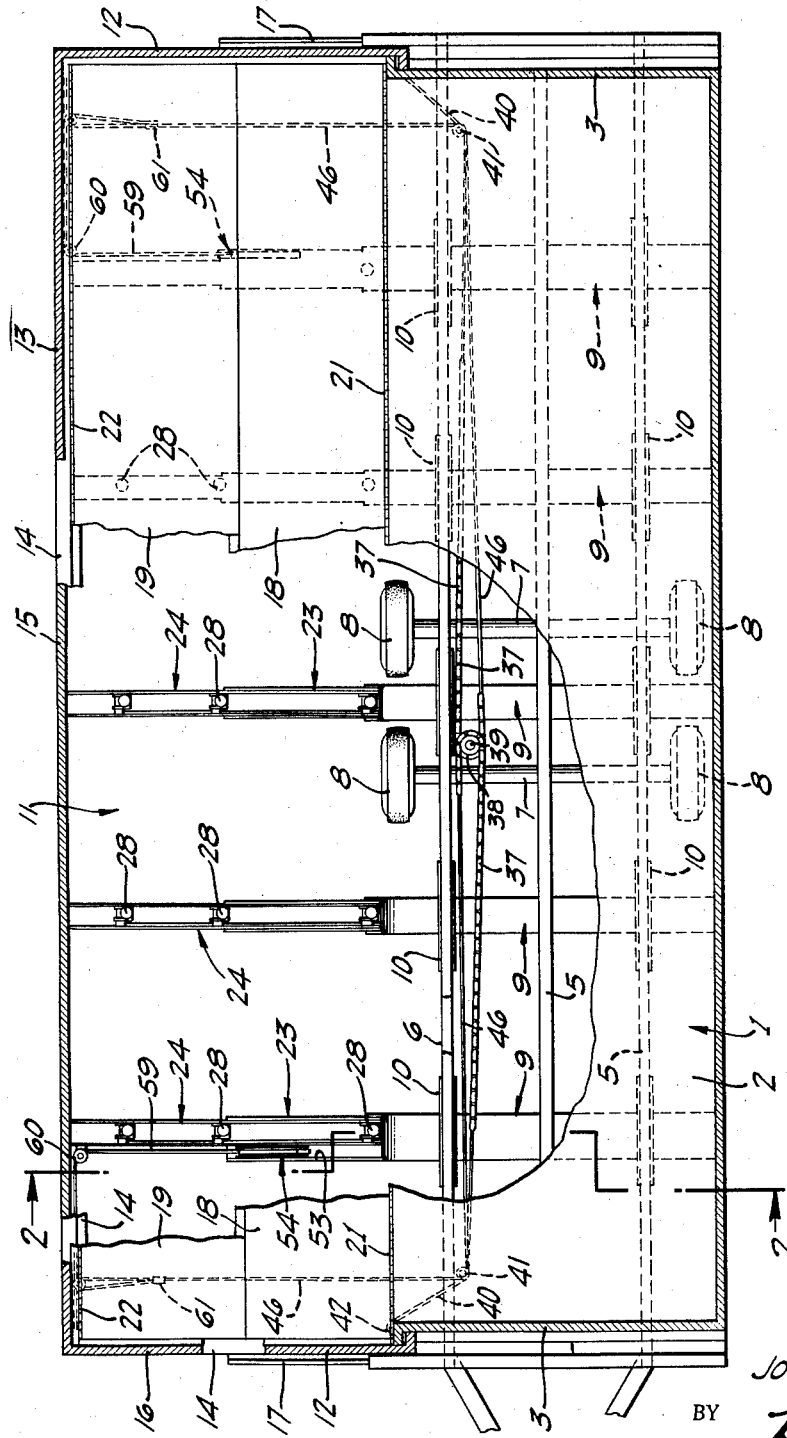

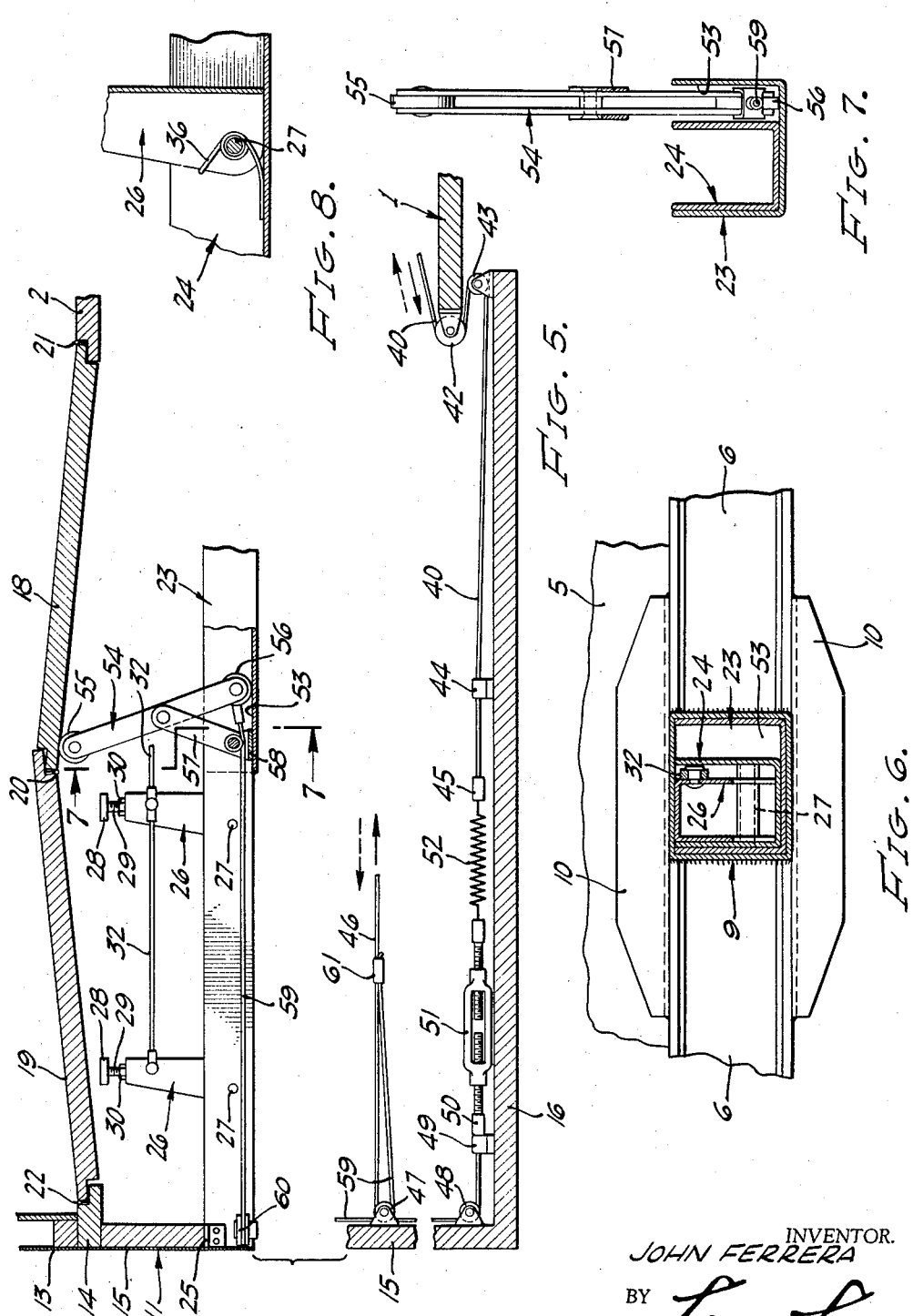

United States Patent Office 2,898,144
Patented Aug. 4, 1959

2,898,144

FLOOR SUPPORTING MEANS FOR EXPANSIBLE TRAILERS

John Ferrera, Los Angeles, Calif.

Application July 22, 1957, Serial No. 673,461

15 Claims. (Cl. 296—23)

My invention relates to floor supporting means for expansible trailers, more particularly to floor supporting means for expansible trailers of the type disclosed in my copending patent applications: Serial No. 379,932, filed Sept. 14, 1953, for Expansible House Trailer, and Serial No. 590,292, filed June 8, 1956, for Extensible Trailer.

Included in the objects of this invention are:

First, to provide a floor supporting means for trailers having a fixed floor and a foldable floor, the supporting means including housings under the fixed floor, extensible joist units movable under the foldable floor, and floor supporting pillars adapted to project upwardly from the joist units to support the foldable floor; the joist units and pillars being retractable into said housings when the trailer is contracted and the foldable floor folded.

Second, to provide a floor supporting means for expansible trailers wherein the housings for the extensible joists are disposed below the joists which support the fixed floor of the trailer, so as to avoid completely any interference with plumbing, air ducts, or electrical wiring as may be disposed under the fixed floor between its joists.

Third, to provide a floor supporting means for expansible trailers which may be arranged for automatic extension and retraction with expansion and contraction of the trailer.

Fourth, to provide a floor supporting means for expansible trailers which incorporates a novel thrust means operative, when the trailer is expanded and the foldable floor unfolded or flat to initiate folding of the floor, to permit contraction of the trailer, the thrust means being collapsible for retraction into the housings of the extensible joist units.

With the above and other objects in view, as may appear hereinafter, reference is directed to the accompanying drawings in which:

Figure 1 is a substantially diagrammatical, sectional view taken immediately above the floor level of the expansible trailer with the trailer sections shown in their extended position and with portions of the floor broken away to show the underlying construction;

Fig. 2 is an enlarged, fragmentary, transverse sectional view through 2—2 of Fig. 1, showing one of the expansible transverse joist structures in its extended position;

Fig. 3 is a further enlarged, fragmentary, sectional view through 3—3 of Fig. 2;

Fig. 4 is a further enlarged sectional view, similar to Fig. 2 but showing the extensible floor joist structure in its retracted position;

Fig. 5 is a composite sectional view showing a portion of one of the extensible floor joist structures in vertical section and showing fragmentarily an end portion of the expansible trailer and cable control in horizontal section, and stressing particularly the means for initiating folding of the trailer floor;

Fig. 6 is an enlarged, fragmentary, transverse sectional view through 6—6 of Fig. 4;

Fig. 7 is a fragmentary, transverse sectional view through 7—7 of Fig. 5;

Fig. 8 is a fragmentary view showing a modified form of floor pillar.

The floor supporting means is intended particularly for use in conjunction with expansible trailers of the type disclosed in the hereinbefore listed copending applications. Expansible trailers of this type include a fixed trailer section 1 having a fixed floor 2, end walls 3, and one side wall 4. The floor is supported by longitudinally extending fixed floor joists 5.

The fixed trailer section 1 is supported on a pair of longitudinal rails 6 forming part of a chassis frame. The rails 6 are supported by springs, not shown, on axles 7 having wheels 8 at their extremities.

In the exercise of the present invention, the longitudinal chassis frame rails 6 are connected transversely by boxed housings 9, that is, each housing is in the form of a square or rectangular tube. The housings 9 are preferably located in the plane of the longitudinal rails 6 and therefore interrupt the rails. The housings are welded to the rails 6, and reinforcing members 10 bridge the housings above and below the rails 6. The reinforcing members 10 may be in the form of channel members and arranged to carry a pair of the longitudinal joists 5.

It will thus be observed that the housings 9 are spaced from the underside of the fixed floor 2 a distance equal to the vertical depth of the floor joists 5. This space between the joists 5 is quite essential for air ducts, plumbing, and electrical wiring, not shown.

The fixed trailer section 1 is adapted to receive telescopically an extensible trailer section 11 having two end walls 12 and a side wall 13. The end walls 12 and side wall 13 preferably rest on a floor-supporting flange 14. The flange underlying the side wall 13 rests on a longitudinal joist 15, whereas the portion of the flange underlying the end walls 12 rests on cross joists 16.

The cross joists 16 at the ends of the extensible trailer rest on extensible portions or track units 17, more fully described in the aforementioned application, Serial No. 590,292. The track units 17 are in turn supported by the extremities of the longitudinal rails 6 of the chassis frame, immediately beyond the end walls 3 of the fixed trailer section 1. The longitudinal chassis frame rails 6 converge beyond one end of the fixed trailer section 1 and are provided with a suitable trailer hitch, not shown.

The extensible trailer section 11 is provided with a foldable floor including two floor units 18 and 19, which are joined together by a hinge 20. The floor unit 18 is joined by a hinge 21 to the fixed floor 2 and the floor unit 19 is joined by a hinge 22 to the longitudinal portion of the floor-supporting flange 14. When the trailer sections are extended, the floor units 18 and 19 lie flush with the fixed floor 2. When the trailer is retracted, the trailer section 11 telescopes over the fixed trailer section 1 and the floor units 18 and 19 jackknife to a vertical position, such as indicated fragmentarily in Fig. 4.

The roofs (not shown) of the two trailer sections and the lateral extremities of the end walls 3 and 12 are provided with suitable overlapping flanges which include seal means so that upon expansion of the trailer sections a seal connection is afforded.

Each of the cross joist housings 9 slidably receives an intermediate extensible joist 23 which may be channel-shaped in cross section. Each intermediate extensible joist slidably receives a terminal extensible joist 24, which is also channel-shaped in cross section. The intermediate joist 23 is intended to extend about one-half its length from the housing 9, whereas the terminal joist 24 extends half its length from the intermediate joist. The extremity of each terminal joist 24 is secured by a bracket or other suitable fitting 25 to the longitudinal joist 15 underlying the side wall 13 of the extensible trailer section 11.

Rollers or other conventional anti-friction means, not shown, may be provided between the housing members 9, intermediate joist 23, and terminal joist 24. However, as will be brought out hereinafter, the members may have rather loose telescoping fits and may be substantially free of loads during expansion and contraction of the trailer sections to minimize the need of anti-friction means.

Each terminal floor joist 24 is provided with a series of foldable supporting pillars 26. Each pillar may be channel-shaped in cross section and joined to the terminal joist at its lower end by a hinge pin 27. Each pillar is so shaped and its hinge pin is so located that the pillar is movable between a folded position extending longitudinally of its terminal joist 24 within the confines of the joist and a vertical or upright position. The direction of pivotal movement is such that the extended end of each pillar, when the pillar is folded, is directed toward the extended end of the terminal floor joist. The vertical height of each pillar is such as to extend from the terminal floor joist to the underside of the floor units 18 and 19.

The extremity of each pillar 26 is provided with a floor supporting pad 28 which may be mounted on a screw-threaded stem 29, screw-threaded into the pillar and adapted to be locked into position by a lock nut 30. The vertical length of each pillar 26 may thus be adjusted so that the folding floor may be supported in a level condition, irrespective of manufacturing tolerances in the connections between the joist housings 9 and their intermediate and terminal floor joists 23 and 24.

The upper side of each housing 9, from which the floor joists extend, may be curved upwardly at its extremity to form a cam lip 31, capable of engaging and tilting each of the pillars 26 to their folded position so that the terminal floor joists 24 may be retracted into the housings 9, as indicated by a comparison of Figs. 2 and 4. In order to pivot the pillars 26 to their upright position, the set of pillars mounted in each terminal floor joist 24 is connected by suitable links 32, which may be in the form of cords or cables joined to each pillar, or link bars pivotally connected thereto, so that the pillars move in unison.

The pillar 26 adjacent the root end of each terminal floor joist 24 is connected by a cable linkage 33, or other flexible connection, to the root or inner end of the corresponding intermediate joist 23 and is secured thereto by a suitable cross fitting or anchor 34. The fitting or anchor 34 may be in the form of a cross bar which may extend transversely from the intermediate joist 23 and ride in slots 35 provided in the side walls of the corresponding housing 9 and thus limit extension of the intermediate joist, or if desired other stop means for limiting movement of the intermediate joist 23 may be provided.

The cable linkage 33 is so arranged that as the terminal floor joists 24 move to their extended position relative to the intermediate joist 23 the cable linkage 33 restrains the pillars 26 causing the pillars to pivot to an upright position. Alternatively, as shown in Fig. 8, the pillars may be provided with uprighting springs 36 coiled around their hinge pins 27 so as to cause each pillar 26 to move to its upright position as it clears the corresponding housing 9.

The trailer sections are expanded and contracted by a cable-actuating means more completely shown and described in the aforementioned application Serial No. 590,292. The cable-actuating means includes a pair of chain sections 37 which extend around sprockets 38 mounted on a drive shaft 39 adapted to be operated by a suitable motor, not shown.

Attached to one end of each chain section 37 is an expansion reach 40 of a pair of control or actuating cables. The expansion reaches 40 extend around pulleys 41 located near the extremities of the fixed trailer section 1 under the fixed floor 2. The expansion reaches continue around pulleys 42 mounted under the end walls 3, then around pulleys 43 mounted at the extremities of the cross joists 16 remote from the longitudinal joist 15, as shown best in Fig. 5. The extremities of the expansion reaches 40 pass through guides 44 and terminate in stops 45 arranged to engage the guides 44 when tension is applied to the expansion reaches 40.

The remaining end of each chain section 37 is connected to a retraction reach 46. The two retraction reaches thus provided also pass around the pulleys 41 (which are double sheave pulleys); then around pulleys 47 attached to the longitudinal joist 15 near its extremities; then around pulleys 48 located on the joists close to their extremities; then through guides 49, and terminating in stops 50. Between the stops 45 and 50 there is provided a turnbuckle 51 and a spring 52.

When tension is applied to the retraction reaches 46, the stops 50 engage the guides 49 anchoring the end of the retraction reaches so that the extensible trailer section 11 is drawn toward the fixed trailer section 1. As the retraction reach 46 is drawn in, the expansion reach 40 is played out, as indicated by the solid arrows in Fig. 5.

Conversely, as indicated by the dotted line arrows in Fig. 5, application of tension on the expansion reaches 40 draw the stops 45 into engagement with the guides 44 so that continued tension draws the pulleys 43 toward the pulleys 42 to effect extension of the extensible trailer section 11.

It will be observed that there is a predetermined lost motion corresponding to the travel distance between the stop 45 and its guide 44 and the stop 50 and its guide 49. The lost motion provided in the cable actuating means thus described is utilized to effect initial folding of the floor units 18 and 19. For this purpose the cross joist housings 9 and their intermediate extensible joists 23 may be increased in width to form accommodation channels 53 at the sides of the corresponding terminal floor joist 24.

Mounted in each accommodation channel 53 is a floor lift strut 54 which may be provided with rollers 55 and 56 at its extremities, which are adapted to bear, respectively, against the underside of the floor unit 18 adjacent the hinge 20 and the bottom or web of the corresponding intermediate joist 23. Joined to each lifting strut 54 intermediate its ends is a fulcrum link 57 pivotally secured by a bracket 58 to the web of the corresponding intermediate joist 23. Each floor lifting strut 54 is movable between a substantially horizontal position within the confines of the channel 53 and an upwardly inclined position in bearing engagement with the floor unit 18.

Attached to each strut 54 at its end having the roller 56 is a cable 59 which extends toward the longitudinal joist 15, around a pulley 60, then extends to the pulley 47, which is a double sheave pulley, and then along that portion of the retraction reach 46 between the pulley 41 and pulley 47. At a suitable point in this portion of the retraction reach the cable 59 is secured to the expansion reach 40 by a grip or clamp 61.

Expansion of the floor supporting means for expansible trailers is as follows:

When the trailer sections are in their retracted position, as indicated in Fig. 4, the intermediate joists 23 and terminal joists 24 are fully retracted within their corresponding joist housings 9. The pillars 26 are disposed horizontally, completely within the confines of the terminal joists. By reason of the fact that the terminal joists are telescoped within the intermediate joists, the cable linkages 33 are in a coil or slack condition. Also, each floor lifting strut or thrust member 54 is in its collapsed or longitudinal position within the confines of its intermediate extensible joist 23 and corresponding housing 9. Still further, under these conditions the cable 59 is in its slack condition so that the floor lifting strut is free to occupy its horizontal position.

When it is desired to extend the trailer section 11, the motor associated with the shaft 39 is operated to draw in on the expansion reaches 40 and to play out the retraction reaches 46. Outward movement of the trailer section 11 from the trailer section 1 draws the terminal floor joists 24 outwardly from their housings 9. Outward movement of the terminal floor joists 24 from their intermediate joists 23 is limited by the cable linkage 33, or if desired by other suitable stop means.

Continued extension of the trailer section 11 causes the pillars 26 to emerge from the housings 9 so that they are caused to tilt by the restraint imposed by the cable linkage 33 to their upright position, such as shown in Fig. 2. This movement may occur just as the extensible trailer section 11 reaches its extended position and the floor units 18 and 19 move to their horizontal position. During extension of the trailer section 11, the floor lifting struts 54 are inactive.

When it is desired to retract the trailer section 11, the shaft 39 is rotated in the opposite direction, drawing in on the retraction reach 46 and playing out the expansion reach 40, as indicated by the solid arrows in Fig. 5.

As indicated previously, there is initial lost motion until the stop 50 moves to the left, as viewed in Fig. 5, to engage the guide 49. This movement is utilized to draw in the cables 59 so as to pivot the floor lifting struts 54 from the position shown in Fig. 2 to the position shown in Fig. 5. This movement lifts the axis of the hinge 20 above the axes of the hinges 21 and 22 so that the floor units 18 and 19 may be jack-knifed upwardly.

Continued retraction of the trailer section 11 causes the terminal floor joists 24 to be pushed into the intermediate joists 23 and to push both of these joists into the housings 9. Telescoping of the terminal joists 24 into the intermediate joists 23 relaxes the cable linkage 33 so that the pillars 26, as they engage the cam lips 31, will tilt to their horizontal positions. Telescoping movement of the terminal joists 24 relative to the intermediate joists 23 also relaxes the cables 59 so that the floor lifting struts 54 are free to collapse to their essentially horizontal position and enter the housings 9.

It should be noted that the extensible floor joists formed by the housings 9, intermediate joists 23, terminal joists 24, and pillars 26 are not subjected to any lateral or transverse bearing loads during expansion or contraction. Furthermore, they may be made to slide freely or even relatively loosely, so that manufacturing tolerances are thus liberal and correspondingly decrease the cost of manufacture.

It should also be observed that the terminal joists 24 do not function in cantilever fashion, but are supported at their extremities by the longitudinal joist 15 and at their root ends by the housings 9. Thus any play due to the looseness of fit of the terminal joists 24 or the intermediate joists 23 is not magnified towards the extremities of the terminal joists, as would be the case if the terminal joists were to function as cantilever beams. In any case, vertical adjustment of the pads 28 ensure full support for the folding floor units.

Also, by reason of the fact that the terminal floor joists 24 are supported at both ends rather than as cantilever beams, the intermediate joists 23 may be omitted. However, the intermediate joists 23 are preferred in order to provide a more rugged construction and to provide support for the floor lifting struts 54.

It also will be observed that by reason of the location of the extensible floor joists at levels spaced downwardly from the floor level, adequate space is provided for the accommodation of plumbing, air or heating ducts, and electrical wiring, as may be required.

While particular embodiments of this invention have been shown and described, it is not intended to limit the same to the exact details of the constructions set forth, and it embraces such changes, modifications, and equivalents of the parts and their formation and arrangement as come within the purview of the appended claims.

What is claimed is:

1. Floor supporting means for expansible trailers having trailer sections arranged for relative lateral expansion and retraction, a fixed floor for one of the trailer sections and a foldable floor for another of said trailer sections, said means comprising: a plurality of extensible floor joists disposed under said floors for lateral extension and retraction with said trailer sections; and a plurality of floor supporting pillars movably mounted on said floor joists, each of said pillars being movable on its joist between an upwardly extending position between said floor joists and floor when said floor joists are extended and a storage position on said joist when said floor joists are retracted.

2. Floor supporting means for expansible trailers having trailer sections arranged for relative lateral expansion and retraction, a fixed floor for one of the trailer sections and a foldable floor for another of said trailer sections, said means comprising: a plurality of extensible floor joists disposed under said floors for lateral extension and retraction with said trailer sections; a series of floor supporting pillars pivotally connected to each floor joist; means for folding said pillars to positions below the upper extremities of said floor joists when said floor joists are retracted; and means for moving said pillars upwardly to upright floor supporting positions when said floor joists are extended.

3. A floor supporting means for expansible trailers as set forth in claim 2, wherein: spring means interconnected between said pillars and floor joist units urge said pillars to their upright positions and cam means at the entrance of said joist housings deflect said pillars into their folded positions.

4. A floor supporting means for expansible trailers as set forth in claim 2, wherein: each of said joist units is provided with a series of said pillars, and link means interconnect said pillars and corresponding joist housings to pivot said pillars into their upright positions as their joist unit reaches its extended position.

5. A floor supporting means for expansible trailers as set forth in claim 2, wherein: said pillars include adjustable floor leveling elements at their extremities.

6. Floor supporting means for expansible trailers having a pair of trailer sections arranged for relative lateral expansion and retraction, a fixed floor for one of the trailer sections and a foldable floor for the other of said trailer sections, said means comprising: a plurality of extensible floor joists disposed under said floors for lateral extension and retraction with said trailer sections; a plurality of floor supporting pillars carried by said floor joists, each of said pillars being movable between an upright position when said floor joists are extended and a folded position when said floor joists are retracted; thrust means carried by at least some of said extensible floor joists, said thrust means being vertically extensible from said floor joist to engage said foldable floor, and collapsible within said floor joist as said floor joist is retracted; and means operative, when said floor joists are extended, for causing said thrust means to engage said foldable floor to initiate folding thereof.

7. Floor supporting means for expansible trailers having a pair of trailer sections arranged for relative lateral expansion and retraction, a fixed floor for one of the trailer sections and a foldable floor for the other of said trailer sections, said means comprising: fixed transverse joist housings disposed under and spaced from said fixed floor; transverse joist units for said folding floor retractable into and extensible from said housings as said trailer sections are retracted and extended; a plurality of floor supporting pillars carried by said joist units, said pillars being pivotable between positions longitudinally of said joist unit for retraction therewith into said housings, and upright positions for engaging and supporting said foldable floor; thrust means carried by at least some of said joist units and positioned, when said joist units are extended, for upward thrust against said foldable floor, said thrust means being collapsible for entrance into the housing of said joist unit on retraction of said joist unit; and means connected with said thrust means for operating said thrust means when said joist units are extended, thereby to initiate folding of said foldable floor.

8. Floor supporting means for expansible trailers having a pair of trailer sections arranged for relative lateral expansion and retraction, a fixed floor for one of the trailer sections and a foldable floor for the other of said trailer sections, said means comprising: a plurality of fixed transverse joist housings disposed under said fixed floor; a transverse joist unit for each joist housing including an intermediate joist element movable between a retracted and a partially extended position relative to said housing, and a terminal joist element movable between a retracted position relative to said intermediate joist element and housing and a partially extended position relative to said intermediate joist element, wherein said terminal joist element is substantially fully extended relative to said housing and is disposed under said foldable floor; a series of floor supporting pillars movably mounted on each terminal joist element, each pillar being movable on its joist between a storage position for retraction into said housing and an upwardly extending position for supporting engagement with said foldable floor.

9. Floor supporting means for expansible trailers having a pair of trailer sections arranged for relative lateral expansion and retraction, a fixed floor for one of the trailer sections and a foldable floor for the other of said trailer sections, said means comprising: a plurality of fixed transverse joist housings disposed under said fixed floor; a transverse joist unit for each joist housing including an intermediate joist element movable between a retracted and a partially extended position relative to said housing, and a terminal joist element movable between a retracted position relative to said intermediate joist element and housing and a partially extended position relative to said intermediate joist element, wherein said terminal joist element is substantially fully extended relative to said housing and is disposed under said foldable floor; a series of floor supporting pillars pivotably supported by each terminal joist element, each pillar pivotable between a position longitudinal of said joist element for retraction into said housing and an upright position for supporting said foldable floor.

10. A floor supporting means for expansible trailers as set forth in claim 9, wherein: spring means urge said pillars to their upright positions and cam means deflect said pillars into their longitudinal positions.

11. A floor supporting means for expansible trailers as set forth in claim 9, wherein: link means are interconnected between said pillars of each joist unit and anchored to the corresponding housing to pivot said pillars into their upright position as said terminal joist element approaches its extended position; and fixed means is provided to engage said pillars as said terminal joist element is retracted to pivot said pillars to their longitudinal position.

12. A floor supporting means for expansible trailers as set forth in claim 9, wherein: said pillars include adjustable floor leveling elements at their extremities.

13. Floor supporting means for expansible trailers having a pair of trailer sections arranged for relative lateral expansion and retraction, a fixed floor for one of the trailer sections and a foldable floor for the other of said trailer sections, said means comprising: a plurality of fixed transverse joist housings disposed under said fixed floor; a transverse joist unit for each joist housing including an intermediate joist element movable between a retracted and a partially extended position relative to said housing, and a terminal joist element movable between a retracted position relative to said intermediate joist element and housing and a partially extended position relative to said intermediate joist element, wherein said terminal joist element is substantially fully extended relative to said housing and is disposed under said foldable floor; a series of floor supporting pillars carried by each terminal joist element, each pillar being movable between a folded position for retraction into said housing and an upright position for supporting engagement with said foldable floor; thrust means carried by at least some of said intermediate joist elements and positioned, when said intermediate joist elements are in their partially extended position, for movement to exert an upward thrust on said foldable floor to initiate its folding movement, said thrust means being collapsible into a position for retraction with said intermediate floor joist into said housing; and means operatively connected with said thrust means, when said floor joist units are extended, to cause said thrust means to initiate folding of said foldable floor.

14. An expansible trailer construction, comprising: a trailer chassis frame including longitudinal rails for transverse frame members, said frame members being tubular and also forming transverse joist housings; wheels for supporting said chassis frame; longitudinal joists supported by said chassis frame and disposed above said transverse joist housings; a fixed floor on said longitudinal joists; a foldable floor hinged at one longitudinal side of said fixed floor, said foldable floor including a pair of floor sections hinged together for movement between an extended position flush with said fixed floor and a folded upright position along its hinged connection with said fixed floor; a transverse joist unit for each joist housing including an intermediate joist element movable between a retracted and a partially extended position relative to said housing, and a terminal joist element movable between a retracted position relative to said intermediate joist element and housing and a partially extended position relative to said intermediate joist element, wherein said terminal joist element is substantially fully extended relative to said housing and is disposed under said foldable floor; a series of floor supporting pillars carried by each terminal joist element, each pillar being movable between a folded position for retraction into said housing and an upright position for supporting engagement with said foldable floor.

15. An expansible trailer construction, comprising: a trailer chassis frame including longitudinal rails and transverse frame members, said frame members being tubular and also forming transverse joint housings; wheels for supporting said chassis frame; longitudinal joists supported by said chassis frame and disposed above said transverse joist housings; a fixed floor on said longitudinal joists; a foldable floor hinged at one longitudinal side of said fixed floor, said foldable floor including a pair of floor sections hinged together for movement between an extended position flush with said fixed floor and a folded upright position along its hinged connection with said fixed floor; a transverse joist unit for each joist housing including an intermediate joist element movable between a retracted and a partially extended position relative to said housing, and a terminal joist element movable between a retracted position relative to said intermediate joist element and housing and a partially extended position relative to said intermediate joist element, wherein said terminal joist element is substantially fully extended relative to said housing and is disposed under said foldable floor; a series of floor supporting pillars carried by each terminal joist element, each pillar being movable between a folded position for retraction into said housing and an upright position for supporting engagement with said foldable floor; thrust means carried by at least some of said intermediate joist elements and positioned, when said intermediate joist elements are in their partially extended position, for movement to exert an upward thrust on said foldable floor to initiate its folding movement, said thrust means being collapsible into a position for retraction with said intermediate floor joist into said housing; and means operatively connected with said thrust means, when said floor joist units are extended, to cause said thrust means to initiate folding of said foldable floor.

References Cited in the file of this patent

UNITED STATES PATENTS

| | | |
|---|---|---|
| 2,147,892 | Gray | Feb. 21, 1939 |
| 2,606,057 | Johnson | Aug. 5, 1952 |
| 2,634,462 | Graven | Apr. 14, 1953 |
| 2,704,223 | Houdart | Mar. 15, 1955 |
| 2,732,251 | Meaker | Jan. 24, 1956 |

FOREIGN PATENTS

| | | |
|---|---|---|
| 1,129,556 | France | Sept. 10, 1956 |